Figure 1:
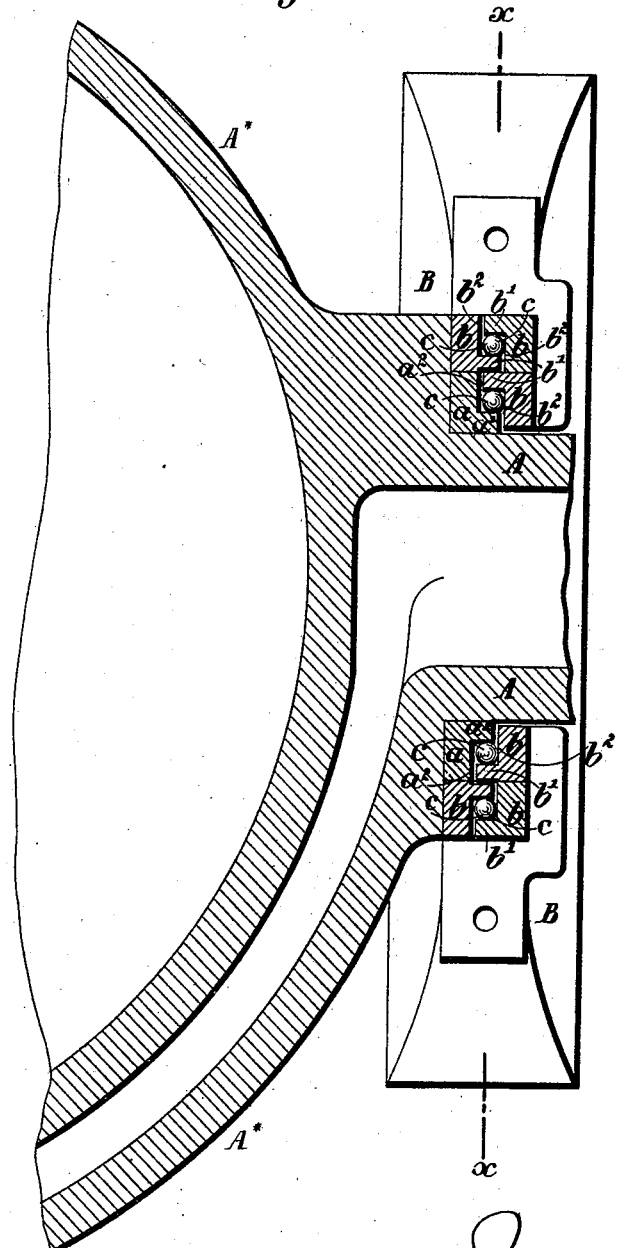

(No Model.) 2 Sheets—Sheet 1.

G. F. SIMONDS.
BALL BEARING.

No. 434,480. Patented Aug. 19, 1890.

Witnesses:
J. A. Rutherford
Percy B. Hills

Inventor:
George F. Simonds
By James L. Norris.
Attorney

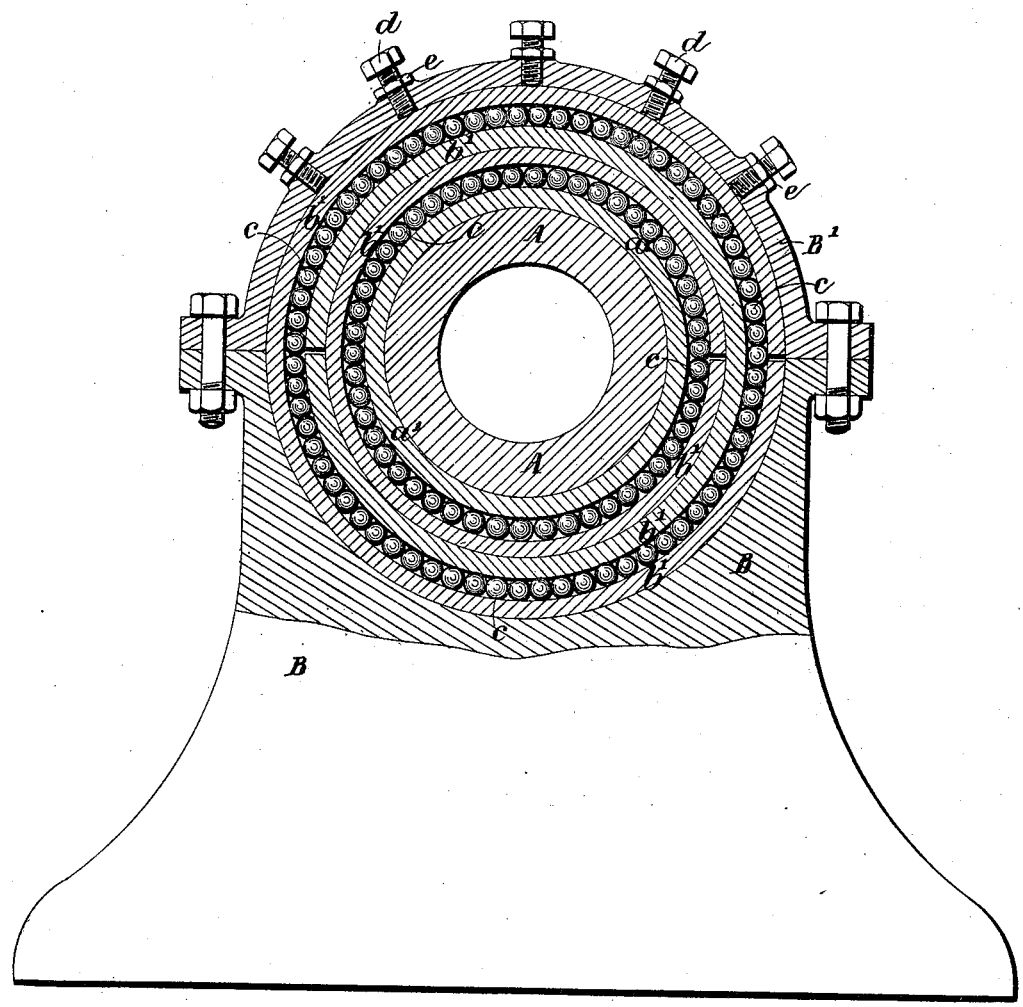

UNITED STATES PATENT OFFICE.

GEORGE FREDERICK SIMONDS, OF FITCHBURG, MASSACHUSETTS.

BALL-BEARING.

SPECIFICATION forming part of Letters Patent No. 434,480, dated August 19, 1890.

Application filed January 16, 1890. Serial No. 337,118. (No model.)

*To all whom it may concern:*

Be it known that I, GEORGE FREDERICK SIMONDS, engineer, a citizen of the United States, and a resident of Fitchburg, Massachusetts, have invented certain new and useful Improvements in Ball-Bearings, of which the following is a specification, reference being had to the accompanying drawings.

My invention relates to trunnion and other bearings in which spherical rollers or balls for diminishing the friction are arranged between concentric surfaces on the oscillating or rotating part, and on the non-oscillating or non-rotating part or on inner and outer rings or annular pieces fitted thereon.

One object of my said invention is to construct trunnion-bearings of this kind or class, which can be advantageously employed for supporting oscillating cylinders. My improvements are, however, applicable to bearings for eccentrics and other rotating or oscillating parts of machinery.

Another object of my said invention is to provide for the adjustment of parts of the bearing to compensate for wear, and thus prevent any "knock" or "hammering" in the bearing by reason of slackness or play of the trunnion, eccentric, or the like therein.

My said invention comprises the combination of two or more circular series or groups of balls arranged between pairs of rings or annular pieces in which the bearing-surfaces are concentric with each other, so that a large collective area of bearing-surfaces can be obtained in a bearing much narrower or shorter than the trunnion-bearings ordinarily used for oscillating cylinders.

My said invention, moreover, comprises the combination, with a complete inner ring or annular piece of split or divided or incomplete rings or annular pieces in which the bearing-surfaces of the several rings are concentric with each other, balls arranged in circular series or groups between the said rings, and means for adjusting the said incomplete rings relatively to each other and to the said complete ring to bring the balls to a bearing or to compensate for wear, if necessary.

In the accompanying drawings, Figure 1 is a horizontal central section of a trunnion-bearing constructed in accordance with my said invention for an oscillating cylinder. Fig. 2 is a vertical section on the line $x\,x$, Fig. 1.

A is the trunnion of an oscillating cylinder $A^*$.

B is the box, casing, or pedestal of the bearing.

$a$ is a complete ring or annular piece fitted and secured upon the trunnion A.

$b\,b$ are split or divided or incomplete rings or annular pieces having their bearing-surfaces concentric with the bearing-surface of the ring $a$. $c\,c$ are the balls, which are arranged in circular series or groups between the said rings. $d\,d$ are screws whereby the said incomplete rings $b$ may be adjusted relatively to each other and to the complete ring $a$ to bring the balls to a bearing or to compensate for wear of the bearing-surfaces or of the balls, or of both the bearing-surfaces and the balls. $e\,e$ are locking-nuts for the said adjusting-screws. I find it advantageous to make the said rings or annular pieces $a\,b$ with circumferential projections, ribs, or flanges $a'\,b'$, formed with concentric bearing-surfaces. The said rings $a\,b$ are, moreover, formed with plane surfaces $a^2\,b^2$, which are parallel to each other and perpendicular or at right angles to the concentric bearing-surfaces, and which form with the said concentric surfaces annular channels or cavities, in which the balls $c$ are arranged.

It will be seen that by constructing the bearing in the manner above described I am enabled to make the same very narrow or short and still provide sufficient bearing-surfaces to sustain a heavy cylinder or to withstand great pressure. Moreover, by employing separate rings secured upon the oscillating or rotating and the non-oscillating or non-rotating parts, as above mentioned, I am enabled to conveniently and effectually harden or temper and finish the bearing-surfaces before the parts of the bearing are put together.

It is obvious that the improvements hereinbefore mentioned are applicable to various forms of bearings for oscillating or rotating parts of machinery in cases where it is desirable to provide a narrow bearing having a large area of bearing-surfaces.

Certain features of construction shown and described in this application, but not claimed herein, are shown and described and claimed in applications Serial Nos. 331,639, filed November 26, 1889, 336,402, filed January 9, 1890, and 337,119, filed January 16, 1890.

What I claim is—

1. A ball-bearing comprising rings or annular pieces having concentric and plane bearing-surfaces formed at right angles to each other, and spherical rollers or balls arranged in concentric series or groups in the same plane in annular channels or cavities between said concentric and plane surfaces, substantially as described.

2. In a ball-bearing, the combination of rings or annular pieces having concentric bearing-surfaces and attached, respectively, to the rotating or oscillating part and to the non-rotating or non-oscillating part, and concentric series or groups of spherical rollers or balls arranged in channels or cavities between the said rings or annular pieces, substantially as and for the purposes set forth.

3. In a ball-bearing, the combination, with a complete ring or annular piece attached to a rotating or oscillating part, of a number of split or incomplete rings or annular pieces, one of which is attached to the rotating or oscillating part, while two are attached to the non-rotating or non-oscillating part, and concentric series or groups of balls arranged between the said rings or annular pieces, the said split or incomplete rings or annular pieces being adjustable to compensate for wear, substantially as described.

4. In a ball-bearing, the combination of a complete ring or annular piece attached to the rotating or oscillating part, split or incomplete rings or annular pieces having bearing-surfaces concentric with the bearing-surface of said complete ring and attached, respectively, to the non-rotating or non-oscillating part and to the rotating or oscillating part, concentric series or groups of balls arranged in channels or cavities between the said rings, and screws for adjusting the said split or incomplete rings relatively to each other and to the complete ring, substantially as and for the purposes set forth.

5. In a ball-bearing, the combination of rings or annular pieces $a\ b$, having concentric and plane surfaces, which form annular channels or cavities of different diameters, but in the same plane, balls $c$, arranged in concentric series or groups in the said channels or cavities, and screws $d$, for adjusting the outer rings relatively to the inner ring, substantially as and for the purposes set forth.

In testimony whereof I have hereunto signed my name in the presence of two subscribing witnesses.

GEORGE FREDERICK SIMONDS.

Witnesses:
DAVID YOUNG,
CHAS. B. BURDON.